Nov. 12, 1946.   J. W. ROBERTS   2,410,902
VEHICLE WHEEL CARRIER
Filed April 5, 1945   3 Sheets-Sheet 1

FIG. I

John W. Roberts
INVENTOR.
BY Loyal J. Miller
ATTORNEY

Nov. 12, 1946.　　　J. W. ROBERTS　　　2,410,902
VEHICLE WHEEL CARRIER
Filed April 5, 1945　　　3 Sheets-Sheet 2

John W. Roberts INVENTOR.
BY Loyal J. Miller
ATTORNEY

Nov. 12, 1946.            J. W. ROBERTS                 2,410,902
                       VEHICLE WHEEL CARRIER
                       Filed April 5, 1945            3 Sheets-Sheet 3

John W. Roberts INVENTOR.
BY Loyal J. Miller
                              ATTORNEY Patented Nov. 12, 1946

2,410,902

UNITED STATES PATENT OFFICE 2,410,902

VEHICLE WHEEL CARRIER

John W. Roberts, Oklahoma City, Okla.

Application April 5, 1945, Serial No. 586,661

7 Claims. (Cl. 214—65)

My invention relates to small carriages or trucks, and more particularly, to wheeled apparatus for manually transporting demounted automotive vehicle wheels and tires about a repair shop or garage.

In heavy duty freight hauling automotive equipment, an individual wheel with mounted tire thereon often weighs as much as three or four hundred pounds. It consequently is quite a chore to remove such a wheel from a vehicle, or to mount the same upon the vehicle. Since the vehicle must obviously be jacked up at the time the wheel is mounted or dismounted, it is apparent that the wheel must be bodily moved vertically in order to get it off or on the usual lug-bolts. A lone person might be able to pry the wheel off the lug-bolts, and let it drop to the floor, but it usually takes at least two persons to lift the wheel, and place it upon the lug-bolts for re-installation upon the vehicle.

It is the prime object of the present invention to provide a manually operated carrier for such heavy wheels, said carrier being capable of raising, lowering, tilting and transporting said wheel and mounted tire.

Another object is to provide a carrier of this class which is so designed that it may be operated in comparatively limited spaces, for instance between parked vehicles.

A further object is to provide a wheel carrier which is adjustable in width to accommodate various tires of different outside diameters.

An additional object is to provide a wheel carrier, in which the draw-bar or tongue is adapted to raise and lower the wheel supporting portion of the device.

Another object is to provide a wheel carrier in which the wheel supporting portion may be locked in various selective vertical positions, after which the tongue may be swung upwardly to conserve space.

A still further object is to provide a wheel carrier in which the tilting mechanism is adjustable, so that the wheel may be more easily placed upon or removed from the usual lug-bolts.

Other objects will be apparent from the following description when taken in conjunction with the accompanying three sheets of drawings, wherein.

Like characters of reference designate like parts in all of the figures wherein they occur.

Figure 1:
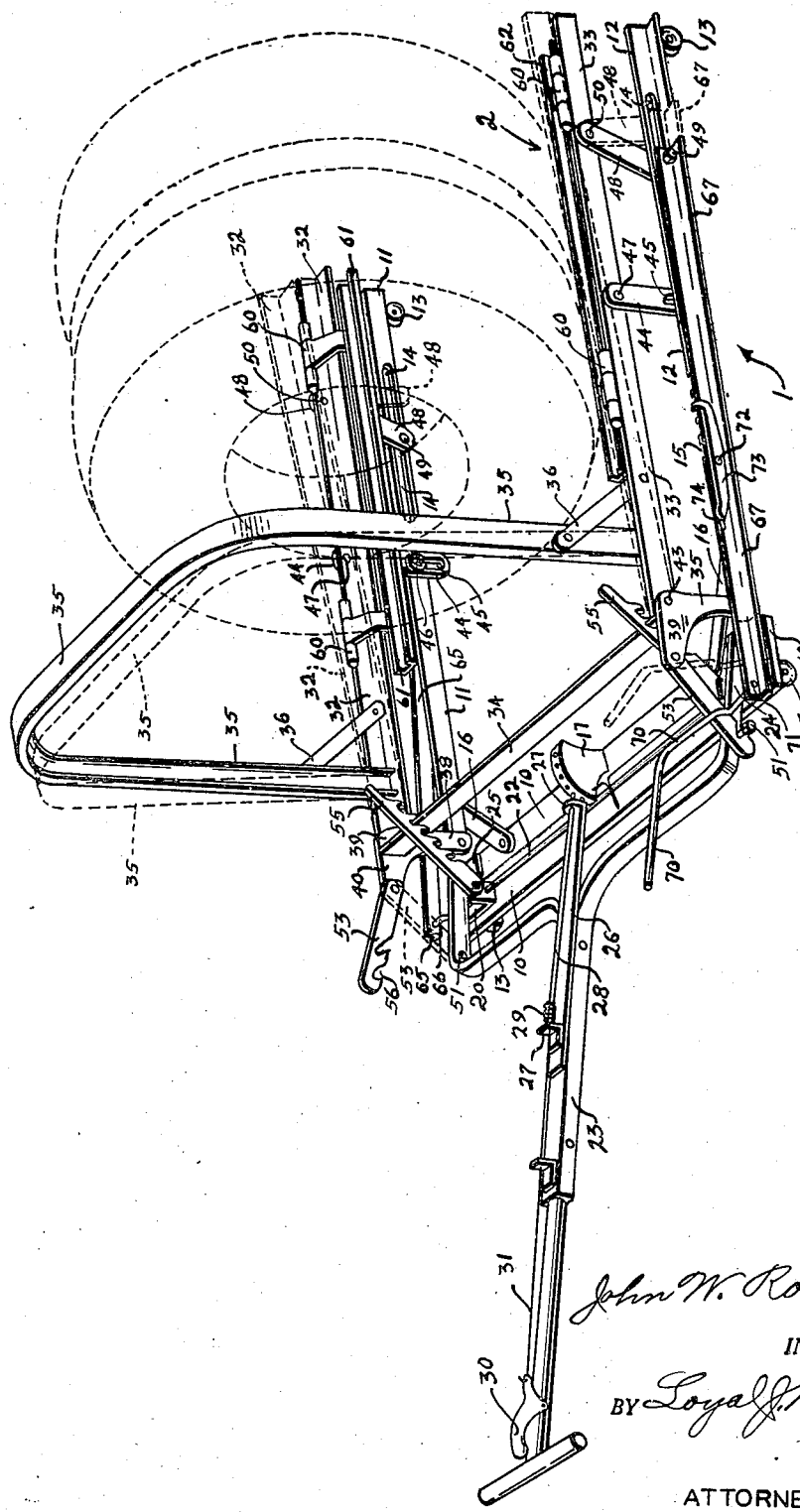
Figure 1 is a perspective view of the device with the wheel supporting portion thereof in raised position, a dual-wheel being shown in dotted lines as being supported thereon.

In its preferred embodiment, the carrier of the present invention is composed of two principal or major sections or units of structure. One of these units, which may well be termed the chassis or running gear, is indicated as a whole by the reference numeral 1. The other major section or unit of the device may well be termed as a wheel supporting frame or body, and is indicated by the numeral 2.

The chassis 1 consists substantially of a horizontal sill 10 extending the full width of the chassis at the front end thereof; a pair of horizontally disposed parallel side members 11 and 12 which have their front ends rigidly connected to or mounted upon the sill 10, one side member being located at each end of the sill; and a plurality of casters 13, two of which are located beneath the sill 10, and one beneath the rear end of each of the side members. The casters are adapted to rollably support the chassis. The sill 10 is preferably made of heavy metal plate, and the side members 11 and 12 are made of angle iron. Horizontal brace members 16 are provided to strengthen the chassis. Adjacent its rear end the upstanding portion of the angle iron side member 12 is provided with an elongated through slot 14, and adjacent its central portion, the upper edge of said side member has a plurality of spaced notches 15. The office of the slot 14 and the notches 15 will be more fully described hereinbelow.

Intermediate its ends, the sill has an upstanding lug 17, the upper end of which has an arcuate surface 18 provided with a plurality of spaced indentations or sockets 19. As may best be seen in Figure 2, the upper surface of the sill 10 is further equipped with two bearing brackets 20, one located adjacent each end of the sill. The brackets 20 are identical, and each preferably includes two spaced ears 21 (Fig. 5) which are alignedly perforated to journal a rod 22 which is more fully described hereinbelow.

The chassis 1 further includes a tongue or draft-bar 23. The lower end of the tongue 23 is forked to form two rearwardly and downwardly extending legs 24 which are pivoted to brackets 25 carried by the upper surface of the sill 10 so that the tongue may swing in a vertical plane.

The upper surface of the tongue 23 has a plate 26 with spaced upstanding brackets 27 which slidably support a latch-rod 28 which extends beyond the plate and is adapted to project into various ones of the indentations 19 of the lug 17. A spring 29 acts to urge the rod toward its extended position. The tongue 23 is further equipped with a pivoted actuating lever 30 and a wire link 31 whereby the latch-rod 28 may be manually withdrawn from engagement with the lug 17 when desired.

The above mentioned wheel supporting frame 2 includes two parallel longitudinally extending horizontal side members 32 and 33 which are held in rigid spaced relation at their forward ends by a cross-member 34. An upstanding substantially U-shaped bow 35 has the ends of its legs rigidly attached to the two side members 32 and 33, preferably by welding, and angle-braces 36 act to reinforce the bow against any movement with relation to the side members 32 and 33. The frame 2 is slightly narrower than the chassis 1, and is mounted on the chassis in the following described manner.

The forward end of the side member 11 of the chassis is pivotally connected by a pin 37 to the lower end of the vertical leg 38 of a substantially L-shaped supporting link 39, the horizontal leg 40 of which extends in a forward direction. The forward end portion of the side member 32 of the frame 2 is pivotally connected to the supporting link 39, at the junction of its two legs, by a pivot pin 41. Another one of the L-shaped supporting links 39 similarly connects the forward ends of the side member 12 and 33, respectively, of the chassis 1 and frame 2, by pivot pins 42 and 43.

At a point substantially mid-way of the length of the side member 11 of the chassis 1, there is provided a straight supporting link 44. The lower end portion of the link 44 is provided with an elongated through slot 45 through which extends a pivot pin 46 carried by the side member 11 of the chassis. The upper end of the supporting link 44 is pivotally connected to the side member 32 of the frame 2 by a suitable pivot pin 47.

Another one of the straight supporting links 44 is similarly connected to the two side members 12 and 33 respectively of the chassis 1, and frame 2.

Another straight link which is indicated by the reference numeral 48, carries a transverse pivot pin 49 which extends through the above described elongated slot 14 in the side member 11 of the chassis 1. The pivot pin 49 is both rotatable and slidable in the slot 14. The upper end of the link 48 is pivotally connected to the side member 32 of the frame 2 by a suitable pivot pin 50. The straight links 48 are somewhat greater in length than the links 44.

From the foregoing description of the link arrangement, it may be seen that pivotal movement of the L-shaped link 39 will raise or lower the frame 2 with relation to the chassis 1. This is due to the fact that the leg 35 of the link 39, and the straight links 44 and 48, all have a simultaneous cam action which forces the frame upwardly when the frame is independently drawn in a forward direction.

As a means for drawing the frame forwardly with relation to the chassis, the legs 24 of the tongue 23 each has a lateral latch-pin 51 which projects outwardly therefrom. To the outer ends of each of the legs 40 of the L-shaped links 39, there is pivotally connected by a pivot pin 52, the upper end of a latch member 53 having a plurality of spaced notches 54 in one edge. One of the notches 54 of each latch member is adapted to engage one of the latch-pins 51, and when so engaged, forward and downward swinging movement of the tongue 23 will cause the upward and forward pivotal movement of the L-shaped links 39. Such movement of the handle, therefore acts to raise or lower the frame 2 with relation to the chassis 1. Since the tongue 23 is equipped with the latch-rod 28 for co-acting with the lug 17 for retaining the tongue in various selected positions, it is thought to be obvious that by latching the tongue in a desired position of adjustment, the frame 2 may also be latched at a desired position of vertical adjustment at desired distances above the chassis 1.

Figure 2:
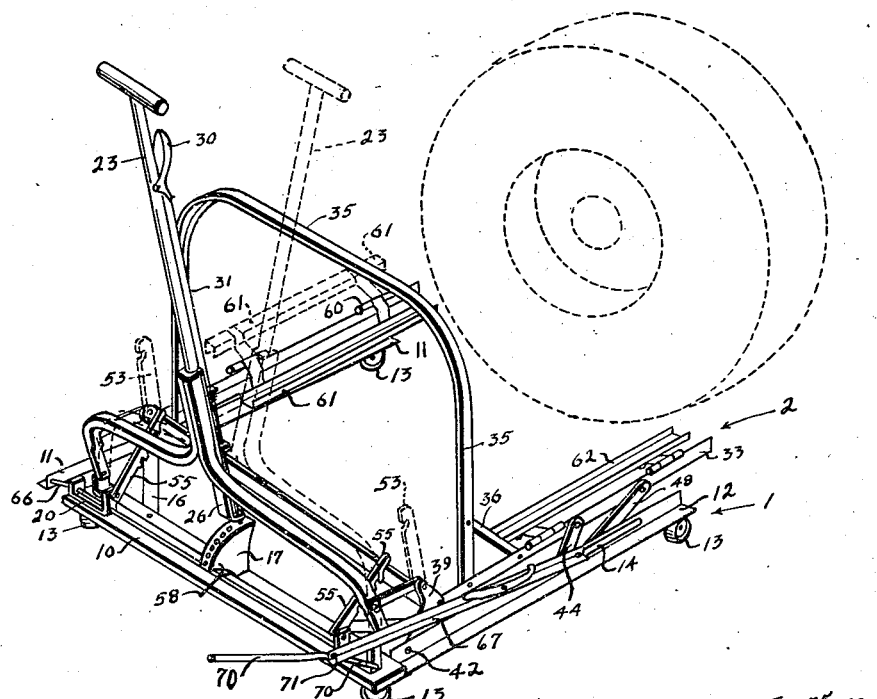
Figure 2 is a somewhat similar view showing the wheel supporting portion of the carrier in lowered position.
Figure 3:
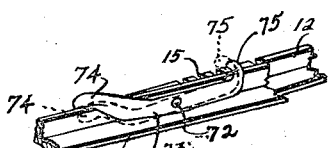
Figures 3 and 4 are enlarged fragmentary perspective views detailing a portion of the adjustable tilting mechanism.
Figure 4:
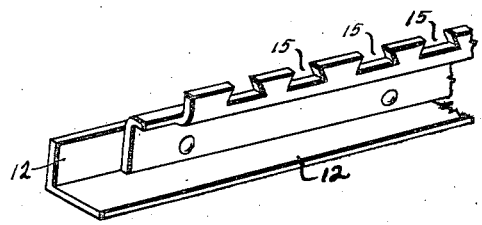
Figures 6, 7:
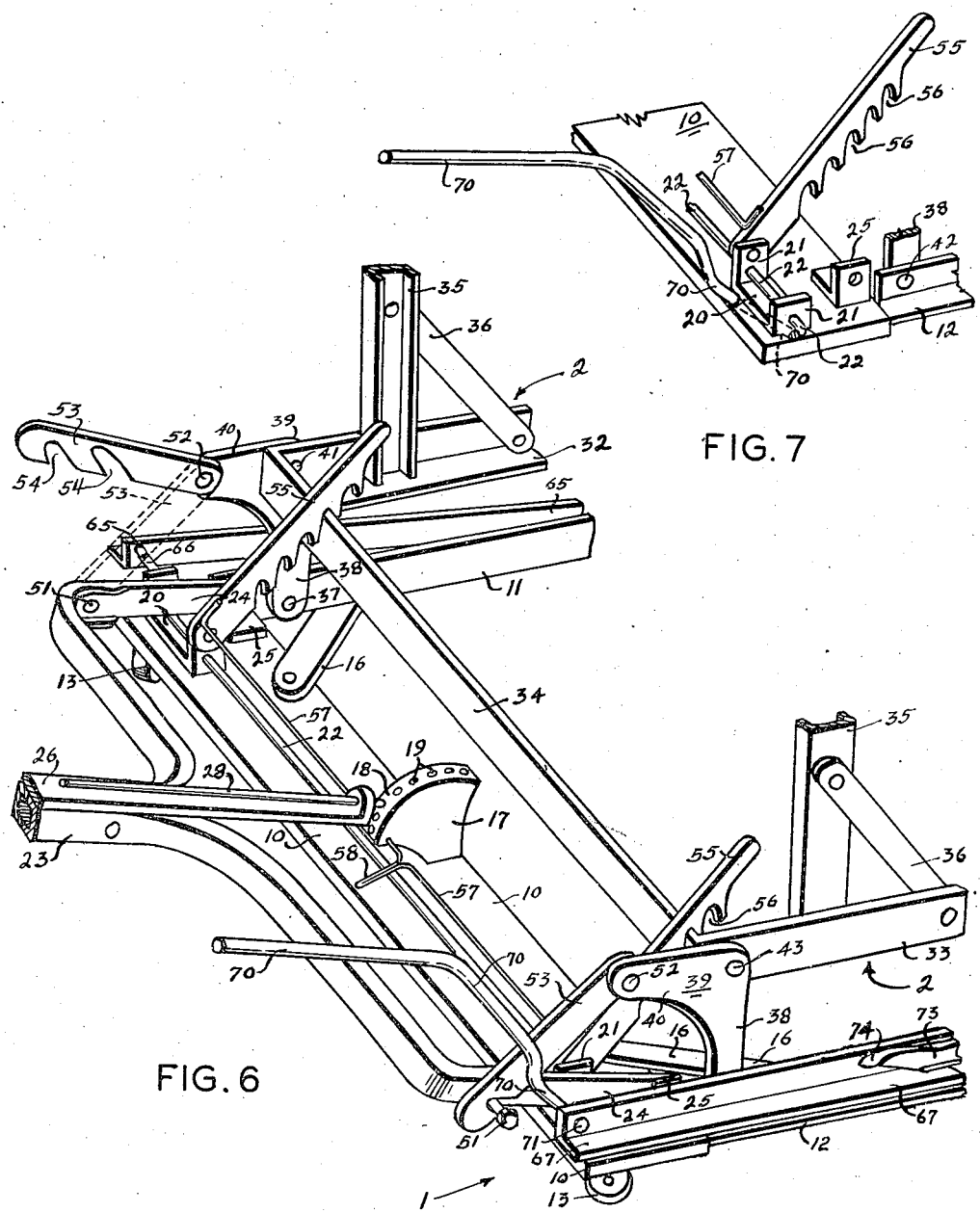
Figure 6 is an enlarged fragmentary perspective view of the forward part of the carrier; and, Figure 7 is a fragmentary perspective view of another portion of the locking mechanism of Fig. 5.

In Fig. 2 of the drawings, the frame 2 is shown in its lowermost position, while Figs. 1 and 6 show the frame in raised horizontal position.

Since it may at times be found desirable to lock the frame 2 in various positions of vertical adjustment, independently of the tongue 23, the brackets 20 carried by the upper surface of the sill 10 of the chassis 1 each pivotally supports the lower end of the latch link 55 having a series of spaced notches 56 in its rearwardly facing edge. The notches 56 of the latch-link 55 are adapted to engage the upper edge of the cross-member 34 of the frame 2 and hold the frame against rearward and downward movement. A horizontally extending actuating rod 57 extends along the upper surface of the sill 10 and is journaled for rotation in the lug 17. The ends of the rod 57 are each welded to one of the latch-links 55 as best shown in Fig. 7. Intermediate its ends, the actuating rod 57 has a forwardly extending handle 58 whereby the rod may be manually rotated to simultaneously move the latch-links 55.

It is apparent that after the latch-links 55 have been engaged over the cross-member 34 as desired, the tongue 23 may be released from the lug 17 and swung upwardly into a vertical position without moving the frame 2. It is often found desirable to so move the tongue in order to get it out of the way. This is particularly true when the device is being used in limited spaces.

The apparatus thus far described hereinabove may, without additional mechanism, well be used in removing and installing wheels upon a vehicle, provided the distance between the two side members 32 and 33 is suitable to accommodate the outside diameter of the tire on the wheel.

If so used, the vehicle axle would first be jacked up, after which the rear end of the carriage would be rolled into position beneath the wheel. After the usual big-bolt nuts have been removed from the lug-bolts, the frame 2 would be raised by downward and forward movement of the tongue 23. The frame 2 would be raised thus sufficiently to take the weight of the wheel off the lug-bolts, and the carriage and the wheel would then be rolled forwardly to remove the wheel from the lug-bolts.

However, since the outside diameter of various vehicle tires varies, and since, in order to be commercially practical, the carriage must be capable of accommodating such various sizes of tires, it has been found desirable to provide the wheel supporting frame 2 with a means for varying the distance between the portions of the frame which give the tire contactual support. To this end, the following described mechanism has been provided.

The side member 32 of the frame 2 is equipped with a pair of spaced hinges 60 which swingably support a metal rail 61. Similarly the side member 32 of the frame has a pair of hinges 60 which swingably support a second rail 62. The hinged arrangement of the two rails 61 and 62 is such that either or both of them may be swung to positions between the side members of the frame. This makes it possible for the carriage to support tires of various outside diameters.

In installing a vehicle wheel upon the usual lug-bolts, the tongue 23 is used as a means to raise or lower the wheel in order to get the lug-bolt holes aligned vertically with the lug-bolts. When a wheel is to be removed from a vehicle, it is necessary that the desired corner of the vehicle be jacked-up a desired distance. This invariably throws the vehicle axle out of a truly horizontal position. It therefore is evident that a means for slightly tilting the frame 2 would be advantageous, so that the lug-bolt holes in the wheel may be disposed at an angle to the horizontal equal to the angle at which the lug-bolts are positioned. In order to provide a means for accomplishing such a precise tilted adjustment of the frame 2, and one which is operable by one hand of the operator, the following described mechanism has been provided on the carriage.

Figure 5:
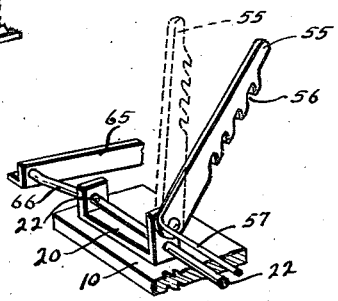
Figure 5 is a fragmentary perspective view detailing a portion of the mechanism for locking the wheel supporting member in raised position.

Lying upon the upper surface of the chassis side member 11, and adapted to nest in the angle thereof, there is provided a slide-member 65 which has its rear end transversely perforated to rotatably receive the outer end of the hereinabove described pivot pin 49 carried by the lower end of the straight link 48. The forward end of the slide-member 65 is pivotally connected to the left hand end 66 of the above described horizontal rod 22 which extends along the upper surface of the sill 10 and which is journaled for rotation in the two brackets 20. This left hand end 66 of the rod 22 is off-set to form a crank, so that rotation of the rod 22 will cause the slide-member 65 to move longitudinally along the side member 11, the forward end of said slide-member being slightly raised during such forward movement (Figs. 5 and 6).

The right hand side member 12 of the chassis 1 is also provided with a slide member which is similar in form to the slide-member 65. This second slide-member is indicated by the reference numeral 67. As clearly shown in Fig. 1, the rear end of the slide-member 67 is pivotally attached to the outer end of the pivot pin 49 which passes through the elongated slot 14 in the side-member 12 of the chassis. As stated hereinabove the pin 49 is carried by the lower end of the straight link 48. It is obvious that longitudinal movement of the slide-member 67 toward the rear of the side member 12 will slide the pin 49 toward the rear of the slot 14. Since the two pins 49 act as fulcrums upon which the straight links 48 turn in order to raise the side members 32 and 33 of the frame 2, rearward movement of the fulcrums acts to increase the distance to which the frame 2 is lifted.

It has been described hereinabove that rotation of the rod 22 moves the crank 66 and shifts the slide member 65 along the side frame member 32 of the chassis. In order to simultaneously partially rotate the rod 22, and to longitudinally shift the slide-member 67 along the side member 33 of the chassis, the right hand end portion of the rod 22 is bent at right angles to its horizontal axis, in order to provide a handle 70 by which the rod may be partially rotated manually (Fig. 7). The handle 70 extends from the horizontal axis of the rod 22 in the same direction as does the crank 66 on the other end of the rod.

The forward end of the slide-member 67 is transversely perforated to receive a pivot pin 71, by which the slide-member is connected to the handle 70 (Fig. 2), at a slight distance from the horizontal portion of the rod 22. That portion of the handle 70 which lies below the pivot pin 71, acts as a crank for longitudinally moving the slide-member when the handle is swung in an arcuate vertical path, with the horizontal rod 22 acting as its pivot axis.

Adjacent that portion of the slide-member 67 which lies nearest the hereinabove described notches 15 in the upper edge of the member 12 of the chassis, the member 67 is transversely perforated to receive a pivot pin 72. The pivot pin 72 passes through the central portion of the latch element 73, having an upwardly bent forward portion 74, adapted to be contacted by the heel of a person's hand for moving the latch. The outer end of the latch 73 has a horizontally extending portion 75, which passes laterally across the upper edge of the slide-member 67 and with its end portion engages within various ones of the notches 15 in the upper edge of the chassis side member 12. Engagement of the end portion 75 of the latch in one of the notches 15, acts to latch or lock the slide-member 67 against longitudinal movement with relation to the side-member 12.

When a wheel borne by the frame 2, is to be installed upon a vehicle, it will be trucked upon the carriage into proper position with relation to the vehicle, and the tongue 23 will be used to raise the frame so as to as nearly as possible, bring the lug-bolt perforations into vertical alignment with the lug-bolts of the vehicle. Should it be found that exact vertical alignment cannot be obtained by use of the tongue 23, the latches 55 will be moved to their latching positions. The rod 28 will then be released from its engagement with any one of the cavities 19 in the lug 17, and if desired, the tongue may be swung upwardly and forwardly in to the dotted line position of Fig. 2, so as to get it out of the operator's way. The operator will then grasp the handle 70 with one hand and release the latch 73 with the other. Manipulation of the handle 70 will enable the operator to align said lug-bolt holes properly, so, that the wheel may be moved over the lug-bolts by movement of the carriage, and while its weight is entirely supported by the carriage. It may often be found desirable to similarly use the handle 70 in removing the vehicle wheel from the lug-bolts. Obviously, movement of the handle 70, and the consequent shifting of the lower ends of the two straight links 48 with relation to the slots 14 in the side members 11 and 12, will cause the rear end of the frame 2 to be tilted from a truly horizontal position. The degree of such tilting is controllable entirely and exactly by the positioning of the handle 70. Since the usual lug-bolts of a vehicle extend in a plane parallel with the longitudinal axis of the vehicle axle, their angle of position is identical with that of the axle. The above described tilting mechanism makes it easily possible for the operator to correctly tilt the frame 2, so that the angle of the axle from the horizontal is compensated for, and so that the wheel may be freely moved on to and off the lug-bolts without any binding whatsoever.

It is thought that the operation of the device may be thoroughly understood from the above description. Also that a wheel carrier has been disclosed hereinabove, which is capable of accomplishing all of the objects and purposes set forth.

In the appended drawings and in the above descriptive matter, only the preferred embodiment of the invention has been disclosed. It is obvious that various changes in the structure could well be made without departing from the principle of the invention, and I therefore do not wish to be confined to only the embodiment disclosed, further than I am limited by the scope of the appended claims.

I claim:

1. Trucking equipment for handling vehicle wheels and tires, including: a wheeled chassis having parallel rearwardly extending horizontal side members rigidly connected together at their front ends; a similarly shaped body; a plurality of spaced sturdy body supporting links, each having one end pivotally connected to the chassis on a horizontal axis, and its other end similarly connected to the body; a draft-tongue having one end pivotally connected to the chassis, whereby its other end may be swung upwardly and downwardly in an arcuate path disposed longitudinally with relation to the chassis; releasable connections between the tongue and the body whereby forward and downward movement of the free end of the tongue causes the body to move upwardly and forwardly on said links; and means for locking the tongue in various positions of vertical adjustment, for holding the body rigidly positioned with relation to the chassis.

2. Organization as described in claim 1, and: means independent of the tongue locking means, for locking the body in various positions of vertical adjustment with relation to the chassis.

3. Organization as described in claim 1, in which the rearmost link on each side member of the chassis may be selectively shifted longitudinally of the chassis, whereby the rear end of the body may be raised thereby, when desired; and a hand-operated lever for selectively controlling said distance.

4. Organization as described in claim 1, and: a longitudinally extending rail parallel with each side member of the body; and hinge means by which the rail may be selectively swung into positions lying either inside or outside of said body side member.

5. Organization as described in claim 1, and means for shifting some of said links longitudinally of the chassis for selectively increasing and decreasing the lifting action thereof.

6. Trucking equipment for handling vehicle wheels and tires, including: A wheeled chassis having parallel and rearwardly extending horizontal side members rigidly connected together at their front ends; a similarly shaped frame; pivoted link means for mounting said frame on said chassis for vertical movement with relation thereto; means for selectively moving said frame horizontally, whereby said link means causes it to also move vertically; a longitudinally extending rail parallel with each side member of the frame; and hinge means whereby said rail may be selectively swung into positions lying either inside or outside of said frame side member.

7. Trucking equipment for handling vehicle wheels and tires, including: A wheeled chassis having spaced parallel rearwardly extending horizontal side members rigidly connected together at their front ends; a similarly shaped frame mounted above the chassis; means for selectively raising and lowering the frame with relation to the chassis; and means for selectively tilting the frame with relation to the chassis.

JOHN W. ROBERTS.